United States Patent
Moe et al.

(10) Patent No.: US 9,030,983 B2
(45) Date of Patent: May 12, 2015

(54) POWER SAVING METHOD AND DEVICE FOR A CELLULAR RADIO SYSTEM

(75) Inventors: Johan Moe, Mantorp (SE); Mehdi Amirijoo, Linköping (SE); Pål Frenger, Linköping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 241 days.

(21) Appl. No.: 13/577,331

(22) PCT Filed: Feb. 8, 2010

(86) PCT No.: PCT/SE2010/050148
§ 371 (c)(1),
(2), (4) Date: Aug. 6, 2012

(87) PCT Pub. No.: WO2011/096867
PCT Pub. Date: Aug. 11, 2011

(65) Prior Publication Data
US 2012/0307701 A1    Dec. 6, 2012

(51) Int. Cl.
*H04W 52/02* (2009.01)
*H04W 24/02* (2009.01)
*H04W 88/08* (2009.01)

(52) U.S. Cl.
CPC .......... *H04W 52/0206* (2013.01); *H04W 24/02* (2013.01); *H04W 88/08* (2013.01); *Y02B 60/50* (2013.01)

(58) Field of Classification Search
None
See application file for complete search history.

(56) References Cited

U.S. PATENT DOCUMENTS

| 2005/0239472 | A1 | 10/2005 | Wei |
| 2012/0100845 | A1* | 4/2012 | Mildh et al. ................ 455/418 |
| 2012/0113860 | A1* | 5/2012 | Pollanen et al. ............ 370/252 |
| 2012/0295631 | A1* | 11/2012 | Moe et al. ................ 455/452.1 |

FOREIGN PATENT DOCUMENTS

| EP | 2056628 A1 | 5/2009 |
| WO | 2008024055 A2 | 2/2008 |
| WO | 2010110187 A1 | 9/2010 |

OTHER PUBLICATIONS

3rd Generation Partnership Project, "Considerations for Energy Savings in UMTS NodeBs," 3GPP TSG RAN WG1 Meeting #59bis, R1-100287, QUALCOMM Incorporated, Jan. 22, 2010, Valencia, Spain.
3rd Generation Partnership Project, "UTRA Node B energy saving," 3GPP TSG RAN WG1 Meeting #59bis, R1-100598, Ericsson, ST—Ericsson, Jan. 22, 2010, Valencia, Spain.

(Continued)

*Primary Examiner* — Marcus R Smith
(74) *Attorney, Agent, or Firm* — Murphy, Bilak & Homiller, PLLC (57) ABSTRACT

In a method and a device of a cellular radio system the resulting energy consumption if one or many cells are allowed to go to a sleep mode is compared with the current energy consumption. Hereby, a system that continuously can optimize the energy consumption in a cellular radio system can be obtained.

12 Claims, 7 Drawing Sheets

(56) References Cited

OTHER PUBLICATIONS

Sheng, Zhou et al, "Green Mobile Access Network with Dynamic Base Station Energy Saving," National Lab for Information Science and Technology, Tsinghua University, China, Hitachi (China) Research & Development Corporation, MobiCom'09, Sep. 25, 2009. Beijing, China.

3rd Generation Partnership Project. 3GPP TR 32.826 V1.0.0 (Dec. 2009). 3rd Generation Partnership Project; Technical Specification Group Services and System Aspects; Telecommunication management; Study on Energy Savings Management (ESM) (Release 9). Dec. 2009, pp. 1-22.

* cited by examiner

POWER SAVING METHOD AND DEVICE FOR A CELLULAR RADIO SYSTEM

TECHNICAL FIELD

The present invention relates to a method and a device for saving energy in a cellular radio system.

BACKGROUND

Energy efficiency is an important aspect of wireless telecommunication systems. There are many solutions, and they are found in protocols, algorithms and hardware etc. Normally traffic load in the radio network vary; resource utilization is fluctuating between night (normally low) and day (normally high); in night time the spare capacity is running unutilized in the radio network. One approach is to halt partial radio resources during low traffic hours such as between 22.00 and 04.00.

However, legacy wireless telecommunication systems are not built specifically with energy efficiency in mind so solutions are often gross grained. For example it may only be possible to stop a complete cell from transmitting and receiving (discontinuous transmission). Using this approach may result in loss of coverage because capacity is lost since the cell is taken down. As a result it must first be verified that there is radio coverage in the area served also after stopping cell transmission.

Because energy efficiency is becoming more and more important and there is a demand for more energy efficient radio systems, there exist a need for a method and a system for providing more efficient management of energy in radio systems.

SUMMARY

It is an object of the present invention to overcome or at least reduce some of the problems associated with the above.

It is another object of the present invention to provide a method and a device that operates to automatically optimize power consumption in a cellular radio system.

At least one of the above objects is obtained by the method and system as set out in the appended claims. Thus, by automatically comparing the resulting energy consumption if one or many cells are allowed to go to a sleep mode with the current energy consumption, a system that continuously can optimize the energy consumption in a cellular radio system can be obtained.

In accordance with one embodiment a method in a cellular radio network for automatically determining when to allow a first cell to enter a sleep mode is provided. In accordance with the method it is first determined a resulting energy consumption of a set of second cells when the first cell is moved to sleep mode, and the first cell is then allowed to enter a sleep mode based on the determined resulting energy consumption. Hereby, the set of cells that are allowed to enter a sleep mode can be controlled to only allow cells to enter a sleep mode when this actually reduces the overall power consumption. In one embodiment the set of second cells include all cells affected by the first cell going into a sleep mode.

In accordance with one embodiment the first cell is allowed to enter a sleep mode if the total energy consumption of the first cell and the set of second cells is determined to be reduced if the first cell enters as sleep mode.

In accordance with one embodiment the energy consumption of second cells is determined based on the load and channel quality of user equipments served by the first cell.

In accordance with one embodiment the energy consumption of second cells is determined based on historic measurements.

In accordance with one embodiment the first cells are allowed to go to sleep mode in a descending order from the cell giving the highest energy saving to the cell giving the lowest energy saving when more than one first cell is allowed to enter a sleep mode.

The invention also extends to a device configured to implement the method in accordance with the above.

BRIEF DESCRIPTION OF THE DRAWINGS

The present invention will now be described in more detail by way of non-limiting examples and with reference to the accompanying drawings, in which.

DETAILED DESCRIPTION

In accordance with the invention coverage requirements information is determined. The determined coverage requirements can also consider the relevant radio access technologies present in an area for which the coverage is determined. Such information describes for a specific first cell the set of second cells that provide coverage over the entire service area of the first cell. It is also possible to consider partial coverage to some percentage over the service area. The coverage requirements information can for example be determined as described in the international patent application no PCT/SE2009/051008

This information can for example be stored in a data base as a coverage requirement matrix comprising all cells that can be in sleep mode for all considered cells. Below an exemplary matrix is shown.

$$D[\,1\ \ 1\ \ 0\ \ 0\,]$$

$$A\quad B\quad C\quad D$$

In the above exemplary matrix case in only cell D can be in sleep mode. The corresponding row indicates the other cells that need to be in active mode in order to allow cell D to be in sleep mode without jeopardizing the coverage. In this example cells A and B need to be active in order for cell D to be able to go to sleep mode without risking losing coverage.

One exemplary procedure for generating the coverage requirements information is based on path gain or received signal strength information over the service area, possibly reported by localized mobiles or prepared in a cell planning tool. The information can be separated in uplink and downlink coverage. If the first cell service area can be covered by a set of second cells at some percentage level, then the service area can be covered even though the first cell is in sleep mode.

Figure 1:
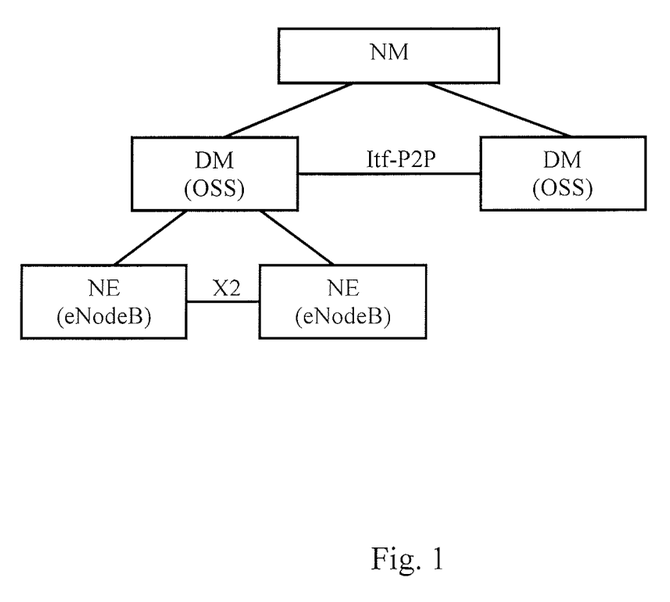
FIG. 1 is a view illustrating a management system for a cellular radio system.

In FIG. 1 an exemplary management system is depicted. The node elements (NE), also referred to as eNodeB, are managed by a domain manager (DM), also referred to as the operation and support system (OSS). A DM may further be managed by a network manager (NM). Two NEs are interfaced by an X2 interface, whereas the interface between two DMs is referred to as an Itf-P2P interface.

In accordance with the invention coverage information is obtained, e.g., through UE measurements, that provides information about which set of second cells that needs to be active in order to avoid jeopardizing coverage if a first cell enters sleep mode. Assuming coverage can be guaranteed by the second cells, then putting the first cell into sleep mode clearly results in an increase of load in the second cells and, thus, energy consumption of the second cells. For the operation to put the first cell into sleep, e.g. by putting it in a Discontinuous transmission (DTX) mode to save energy, the energy consumption increase in the second cells need to be lower than the decrease in the first cell.

Figure 2:
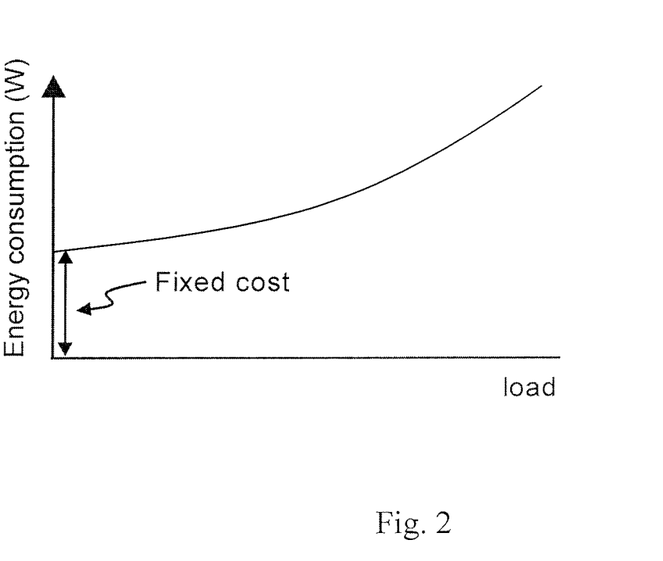
FIG. 2 is a view illustrating power consumption in relation to the load in a cell.

In FIG. 2, a typical energy consumption curve of a radio base station as a function of the load in the cell is depicted. The energy consumption in a base station is typically non-zero at zero load and increases non-linearly as the load on the base station increases. The energy consumption at zero load is referred to as the fixed cost and can vary depending on the type of the base station. Further the slope and the shape of the energy consumption curve may vary depending on the base station.

In accordance with the invention a sleep model transition criteria determined under which conditions the first cell can be allowed to be put into sleep mode. Thus, the first cell can be put into sleep mode when the total energy consumption of the second cells is less than the total energy consumption of the first and second cells (when the first cell is operational). This will result in an overall energy saving in the system In order to determine that an energy saving can be made key characteristics are analyzed by the system. In accordance with one embodiment, the traffic load and energy consumption of the first and second cells are determined. Based on the traffic load and energy consumption of the first and second cells the resulting additional energy consumption of the second cells in case the first cell would be put into sleep mode is determined. If the difference or ratio between the additional power increase in the second cells to the power decrease in the first cell is below a predefined threshold the system can be configured to allow the first cell to go to a sleep mode. In particular if the increase in the second cells is determined to be lower than the decrease in the first cell, the system is configured to allow the first cell to go to a sleep mode.

Figure 3:
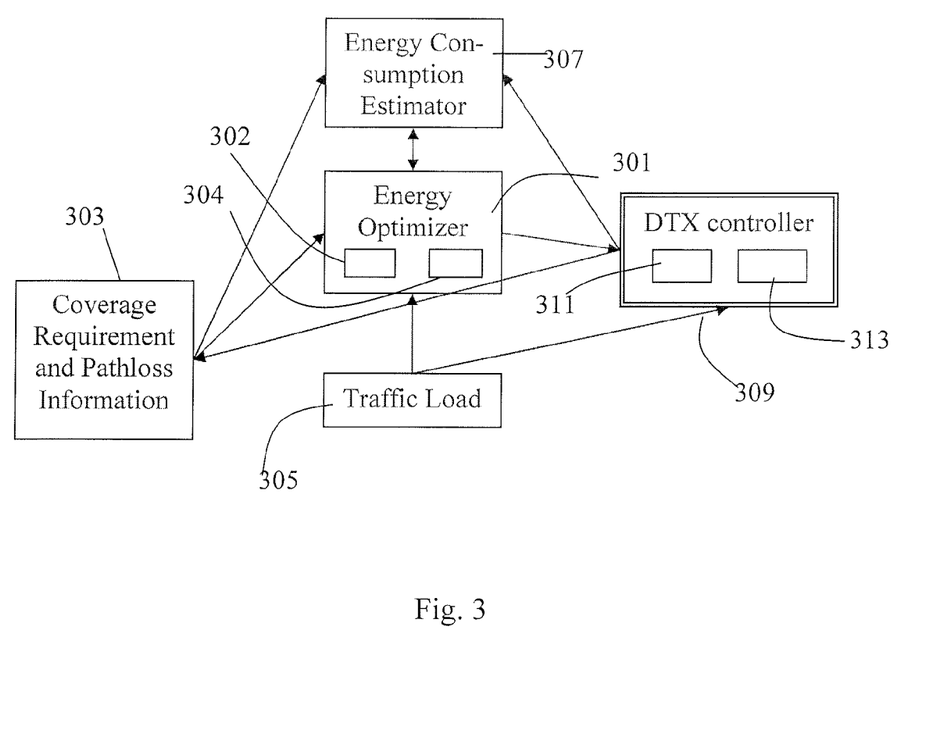
FIG. 3 is a view of a system for optimizing energy consumption in a cellular radio system.

In FIG. 3, a logical overview of different entities and information signaling within a system of such entities is depicted. The system in FIG. 3 can be used to automatically determining to allow a cell to go to sleep mode/DTX mode in accordance with the processes as described herein.

FIG. 3 depicts an energy optimizer 301 which typically can be implemented using a micro controller 302 operating on a set of software instruction stored in a memory 304 of the energy optimizer 301. The energy optimizer can be located in any suitable network node of a radio system such as in a network element or a domain manager or any other suitable node of a radio system such as a radio system depicted in FIG. 1. The energy optimizer 301 receives information from a Coverage Requirement and Pathloss Information database 303, a traffic load estimator 305 and a energy consumption estimator 307. The Coverage Requirement and Pathloss Information database 303 typically provides an up to date view of the current requirements that the radio network needs to fulfill at any given time. The traffic load estimator 305 generates an estimation of the current traffic load for the entire or a subsection of the radio system. In particular the traffic load is estimated per cell (or site). The energy consumption estimator 307 provides an estimation of the power consumption within the radio system and in particular the power consumption for each cell (or site). Based on the information from the entities 303, 305 and 307, the energy optimizer calculates an output indicating the optimal set of cells that is allowed to be active to optimize (minimize) the power consumption within the network and at the same time maintain service levels. The output can for example be provided to a DTX mode controller 309 which in turn selects a number of cells (sites) to be put in DTX mode based on the received result from the energy optimizer 301. The DTX mode controller can for example be implemented using a micro controller or micro processor 311 operating on a set of computer program instructions stored in a memory 313.

In accordance with one embodiment coverage requirements and pathloss information is used to find the set of eligible first cells, i.e., those cells that are candidates for sleep mode. Cells that cannot be covered by other cells are not considered. The Energy Optimizer 301 then selects a set of candidate first cells and evaluates the energy consumption and load of the network, which is done by Energy Consumption and Load Estimation. The Energy Optimizer then selects another set of candidate first cells, followed by a new estimation of the energy consumption. This cycle continues until a set of first cells resulting in minimum energy consumption has been reached. It should be obvious that any combination of first cells can be evaluated. To simplify the description only one first cell is described herein. This can of course be generalized to encompass any sets of first cells (number of first cells >1).

Figure 4:
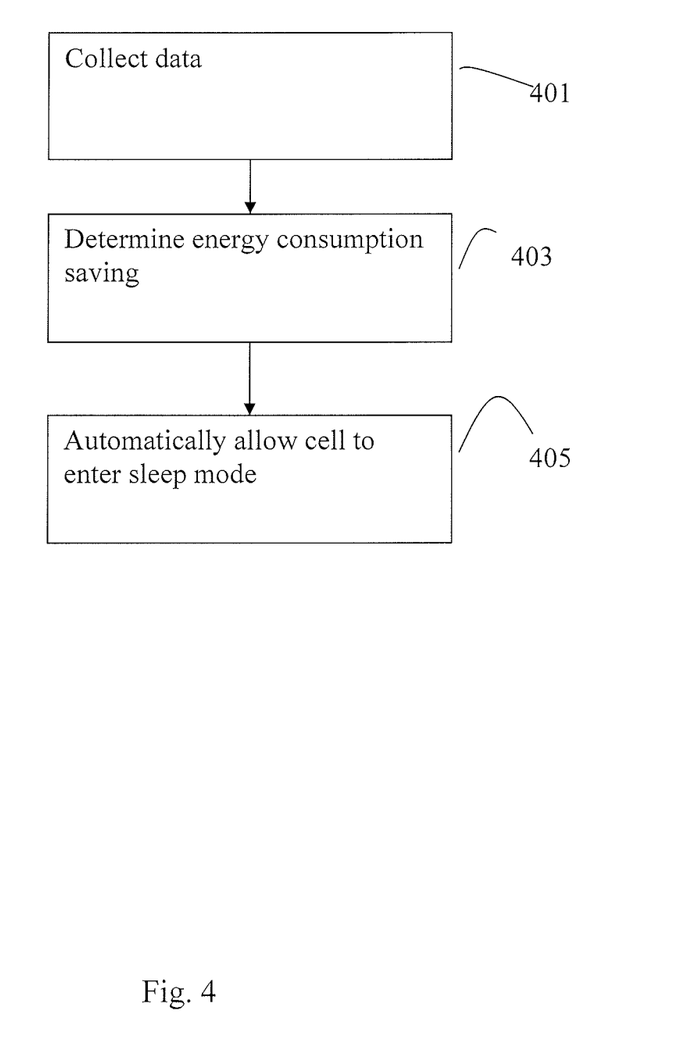
FIG. 4 is a flow chart illustrating some procedural steps performed when optimizing energy consumption in a cellular radio system.

In FIG. 4 a flow chart illustrating some procedural steps performed when determining to automatically allow a cell to enter a sleep mode is depicted. First, in a step 401, some information to base the resulting energy consumption in the system if one cell is put into sleep mode is collected. The information can for example be the traffic load and/or energy consumption of a first cell and a set of second cells affected when the first cell is brought into a sleep mode. Based on the collected information relating to the first and second cells the resulting additional energy consumption of the second cells in case the first cell would be put into sleep mode is determined, in a step 403. Based on the determined resulting energy consumption in the set of second cells the first cell is allowed to enter a sleep mode. For example, if the difference or ratio between the additional power increase in the second cells to the power decrease in the first cell is below a predefined threshold the system can be configured to allow the first cell to go to a sleep mode. In particular if the increase in the second cells is determined to be lower than the decrease in the first cell, the system is configured to allow the first cell to go to a sleep mode.

Below some detailed examples of some possible implementations are described.

Energy Consumption Estimation Example

The Energy Consumption Estimation determines the total energy consumption of the second cells when the first cell is put into sleep mode, where:

$P_F$ is energy consumption of first cell F.

$P_S$ is the energy consumption of second cells S when first cell F is operational.

$P'_S$ is the energy consumption of second cells S when first cell F is in sleep mode.

Figure 5:
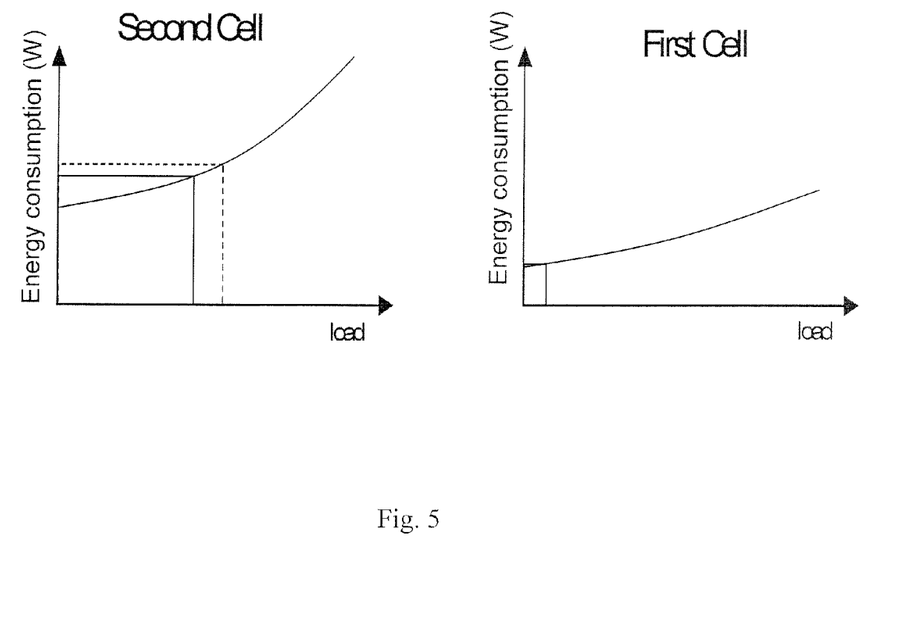
FIGS. 5 and 6 illustrate energy consumption in cells of a cellular radio system.
Figure 6:
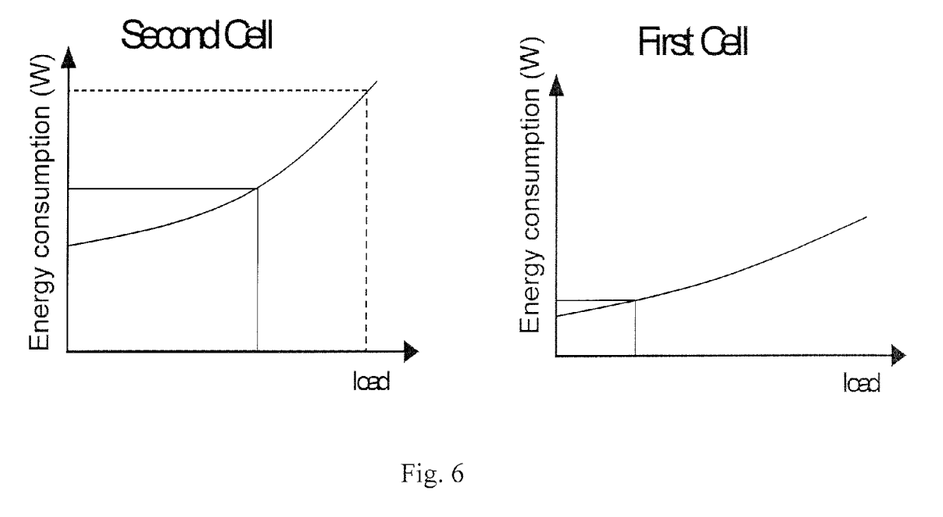

Such an embodiment is depicted in FIG. 5 and FIG. 6.

In FIG. 5 the solid line indicates the energy consumption of the first and second cell when first cell is operational. Dashed line indicates the energy consumption of second cell when first cell is put into sleep mode. The increase in load and energy consumption is a result of the second cell taking over traffic from the first cell. In this case $P'_S < P_S + P_F$ and it is beneficial to put the first cell into sleep mode.

In FIG. 6, the solid line indicates the energy consumption of the first and second cell when first cell is operational. Dashed line indicates the energy consumption of second cell when first cell is put into sleep mode. In this case we have that $P'_S < P_S + P_F$ and as such is it not beneficial to put the first cell into sleep mode.

Similarly, let L to denote the load in a cell. On way to estimate the change in energy consumption of second cell when a first cell is put into sleep mode, i.e., $P'_S$, is to estimate the change in load of the second cells, i.e., $L'_S$. This can be done in many different ways, two of which are described below by using prediction and historic measurements.

Prediction

The prediction should give the additional load on the second cells when the first cell is put into sleep mode. This can be done by considering traffic demand in the first cell, channel quality, e.g., pathloss, from UEs in the first cell to second cells Clearly, as the traffic demand in the first cell increases, the result is an increase in the load applied on the second cells. By utilizing the channel quality to the second cells we may determine the split of first cell UEs and their load demand [bits/s] among the second cells derive the spectral efficiency [bits/s/Hz] of the UEs previously served by the first cell (referred to as "UEs")

Load Split Among Second Cells

In this step the split of the demanded load of the first cell among the second cells. The division of the demanded load among the second cells is obtained by considering the second best servers of the UEs of the first cell. This can be done by considering the second lowest pathloss among the UEs served by the first cell. This information is gathered by the system during normal operation when the first cell is operational and exemplified through the following. Assume that 40%, 35%, and 25% of UEs in the first cell typically report cell A, B, and C respectively being the second best serving cell. Using this information, the system can predict that 40% of the UEs in the first cell will be served by the second cell A etc. The load split can thus be determined by the system based on the reported best serving cells.

Deriving of Spectral Efficiency

Figure 7:
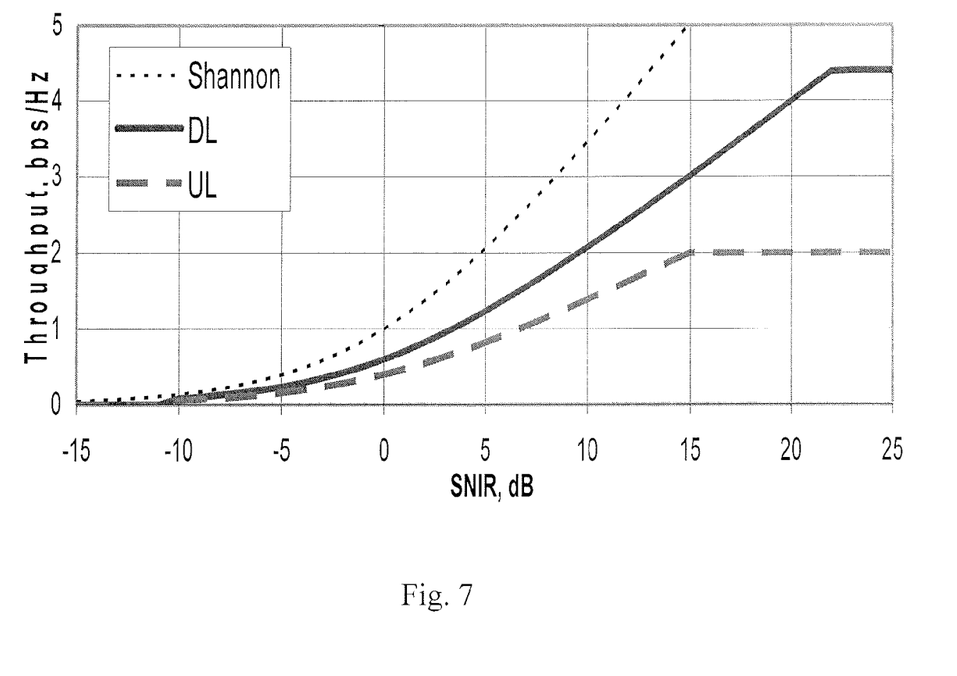
FIG. 7 is a view illustrating a SINR-spectral efficiency curve.

Derivation of the spectral efficiency of the UEs in the first cell can be performed by estimating the SINR and utilizing a SINR-spectral efficiency curve, see FIG. 7. The SINR to the second cells can be estimated using path loss information. For example, when the first cell put into sleep mode, the pathloss to the second best server, i.e., the second cell, increases by 5 dB. This implies a 5 dB degradation in the down link SINR. The corresponding method can also be used in the uplink by further utilizing other user equipment (UE) measurements, e.g., power headroom reports. Having estimated the SINR, the spectral efficiency [bits/s/Hz] is then derived.

Having the spectral efficiency, the system can estimate the increase in load in the second cells, i.e., $L'_S$ considering the traffic demand of the UEs in the first cell. Assuming that the UEs desire a throughput similar to the throughput received in the first cell, the system can calculate the bandwidth and thereby the number of resource blocks that need to be scheduled in average by utilizing the spectral efficiency mentioned above. By adding the total resource block assignment in the average sense the system can compute $L'_S$.

Load Transfer Information

Having determined the workload split and estimated spectral efficiency for example as described above the system can derive the load of the second cells given that the first cell is put into sleep mode. This information can be continuously updated based on UE measurements, e.g., workload split changes during operation. Alternatively, a correction factor can be introduced to the load transfer, which is based on the actual outcome of putting a first cell to sleep mode. For example, if the load of a second cell is 10% more than the estimated value, then this can be utilized to correct the outcome for future estimations of load transfer.

Energy Optimizer

The energy optimizer can be configured to give tasks to the Energy Consumption and Load Estimation block. The optimizer can start with identifying cells that are likely to give positive result—the lightly loaded cells. In accordance with one embodiment the optimizer can be configured to consider only one first cell at a time. In such an embodiment the energy optimizer for each first cell computes $P'_S$. The first cell that generates the highest $P_S + P_F - P'_S$ is first selected to be put into sleep mode. Then the first cell that has the second highest $P_S + P_F - P'_S$ is selected to be put into sleep mode etc. As a result the cells are allowed to go to sleep mode in a descending order from the cell giving the highest energy saving to the cell giving the lowest energy saving. This can, however, result in a suboptimal solution. An optimal approach would be to test for all combinations of first cells being in sleep. The drawback is that this requires more computational power.

It is advantageous if the optimizer does not consider cases where the first cell cannot be covered by the second cells—i.e. it will use the coverage information. Thus, in accordance with one embodiment the consequences from the real network are feed back to the estimator so that the models can be updated. For example once the estimation is ready and cells are put in sleep information is collected from the live network so that the estimations can be compared with reality. If the difference is large it can be beneficial to update the models.

Using the method and device as described herein will provide automatic derivation under which conditions it is beneficial to enter sleep mode such that the energy consumption of involved base stations is minimized and overloads or Quality of Service (QoS) degradations are avoided.

The invention claimed is:

1. A method in a cellular radio network for automatically determining when to allow a first cell to enter a sleep mode, the method comprising:

determining a resulting energy consumption of a set of second cells if the first cell is moved to the sleep mode; and allowing the first cell to enter the sleep mode based on the determined resulting energy consumption, wherein allowing the first cell to enter the sleep mode based on the determined resulting energy consumption comprises determining whether a difference or ratio between a power increase in the second cells that would result from the first cell entering the sleep mode and a power decrease in the first cell that would result from the first cell entering the sleep mode is below a predefined threshold and, if so, allowing the first cell to enter the sleep mode.

2. The method according to claim 1, wherein allowing the first cell to enter the sleep mode based on the determined resulting energy consumption comprises allowing the first cell to enter the sleep mode if a total energy consumption of the first cell and the set of second cells is determined to be reduced if the first cell enters a sleep mode.

3. The method according to claim 1, wherein the resulting energy consumption of the set of second cells is determined based on the load and channel quality of user equipments served by the first cell.

4. The method according to claim 1, wherein the resulting energy consumption of second cells is determined based on historic measurements.

5. The method according to claim 1, wherein the set of second cells includes all cells being affected by the first cell going into a sleep mode.

6. The method according to claim 1, wherein, when more than one first cell is allowed to enter the sleep mode, the first cells are allowed to go into the sleep mode in a descending order from the first cell giving the highest energy saving to the first cell giving the lowest energy saving.

7. A device for use in a cellular radio network for automatically determining when to allow a first cell to enter a sleep mode, the device comprising a processing circuit configured to:
   determine a resulting energy consumption of a set of second cells if the first cell is moved to the sleep mode, and
   allow the first cell to enter the sleep mode based on the determined resulting energy consumption by determining whether a difference or ratio between a power increase in the second cells that would result from the first cell entering the sleep mode and a power decrease in the first cell that would result from the first cell entering the sleep mode is below a predefined threshold and, if so, allowing the first cell to enter the sleep mode.

8. The device according to claim 7, wherein the device is configured to allow the first cell to enter the sleep mode if a total energy consumption of the first cell and the set of second cells is determined to be reduced if the first cell enters a sleep mode.

9. The device according to claim 8, wherein the device is configured to determine the resulting energy consumption of second cells based on the load and channel quality of user equipments served by the first cell.

10. The device according to claim 7, wherein the device is configured to determine the resulting energy consumption of second cells based on historic measurements.

11. The device according to claim 7, wherein the set of second cells includes all cells being affected by the first cell going into the sleep mode.

12. The device according to claim 7, wherein, when more than one first cell is allowed to enter the sleep mode, the device is configured to allow the first cells to go into the sleep mode in a descending order from the first cell giving the highest energy saving to the first cell giving the lowest energy saving when more than one first cell is allowed to enter a sleep mode.

* * * * *